Aug. 30, 1927.  K. A. SCHUCKER  1,640,908
HEARING SHELL
Filed Sept. 27, 1926
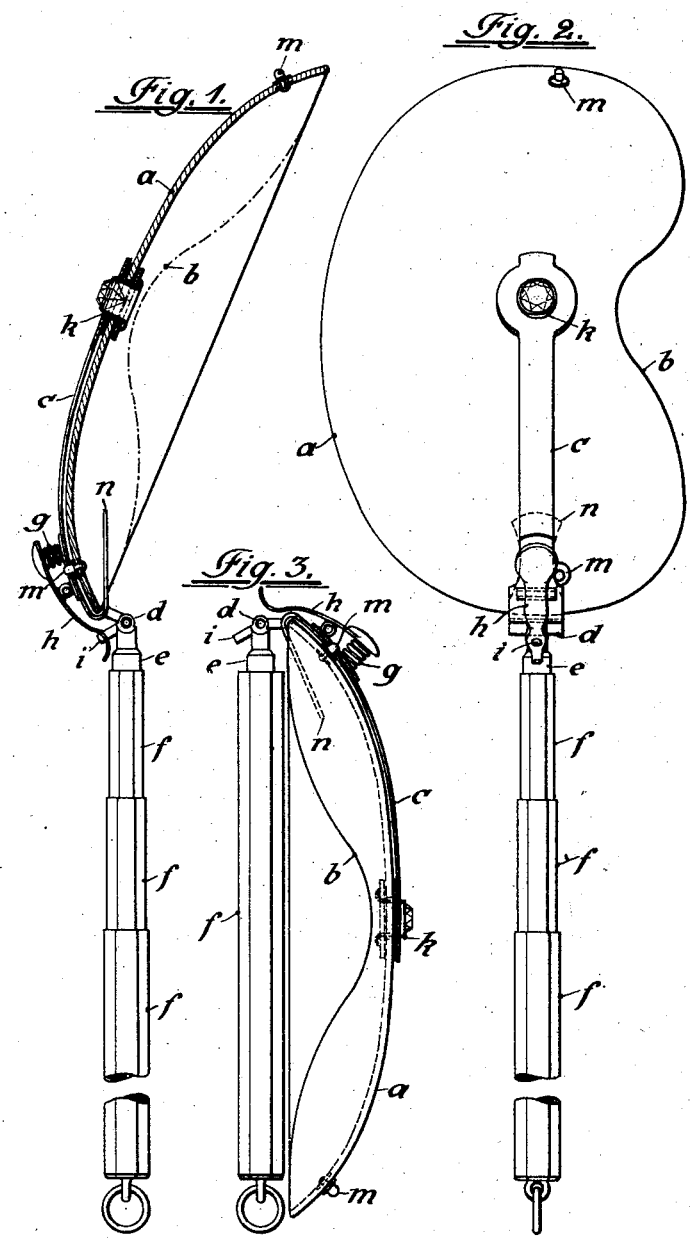

Patented Aug. 30, 1927.

1,640,908

UNITED STATES PATENT OFFICE.

KARL ALBERT SCHUCKER, OF PFORZHEIM, GERMANY.

HEARING SHELL.

Application filed September 27, 1926, Serial No. 138,025, and in Germany January 22, 1926.

This invention relates to a hearing shell which is not designed exclusively for people hard of hearing but to serve as sound strengthener to be used in concerts, at lectures and the like by people on seats which are at some distance from the platform. The hearing shell approximately of the size of a hand and of the shape of the external ear has a handle which is composed of several telescoped elements so that these elements may be pushed the one into the others and the apparatus can be easily carried in the pocket. The shell is rotatably mounted on the handle so that it can be used for the right ear and for the left ear.

The improved hearing shell according to the invention is illustrated, by way of example, in the accompanying drawings, in which:—

Fig. 1 is a side elevation, the hearing shell being shown in longitudinal section and the handle being only partly extended.

Fig. 2 is a rear view of Fig. 1.

Fig. 3 shows in side elevation the hearing shell folded onto the handle, all the elements being pushed the one into the others.

The hearing shell consists of a shell $a$ in the shape of the external ear, approximately of the size of a hand and having in one long side an incurvature $b$ to make it fit into the ear. The shell $a$ is hingedly mounted by means of a holding bow $c$ and of a hinge $d$ on the top end of a handle $e$ composed of several telescoped tubular elements and adapted to be extended for a length of about 30 cms. The tubular elements $f$ of the handle are of polygonal cross section so that they cannot turn the one on the others, the shell $a$ being also prevented from rotating in the handle $e$.

In the position of use the hearing shell $a$ is locked on the handle $e$ by means of a spring controlled lever $h$ engaging over a pin $i$ fixed on the handle $e$. The telescoped handle $e$ can be folded over in the hinge $d$, after the lever $h$ has been disengaged from pin $i$, so that the handle is laying on the inner surface of the hearing shell as shown in Fig. 3, it being easy to carry the instrument in a pocket.

The hearing shell $a$ is at the center of the back rotatably fixed by a hinge $k$ on the bow $c$ so that the incurved portion $b$ may be turned to the right or left side to use the hearing shell for the right or left ear. The hearing shell $a$ is secured in its position by a pin $m$ bearing against the side of the bow $c$. An extension finger $n$ of bow $c$ serves to guide the shell $a$ at the oscillating movement.

I claim:—

1. A hearing shell comprising in combination a shell approximately of the shape of the external ear, a fixing bow on the back of said shell, a handle composed of several tubular telescoped part elements, a hinge connecting the top end of said handle to said bow so that the telescoped handle can be folded over to lay on the front side of said shell, a spring controlled lever on the back of said shell, and a pin on the hinge of said handle designed to engage with said spring controlled lever and to securely hold said shell in the position of use.

2. A hearing shell comprising in combination a shell approximately of the shape of the external ear, a fixing bow on the back of said shell, a hinge for connecting the center of said shell to said bow so that said shell can be turned through 180° on said bow, an abutment pin on the back of said shell designed to bear against the edge of said bow, an extension finger at the top end of said bow bearing on the back of said shell for guiding said shell at its rotation, a handle composed of several tubular telescoped part elements, a hinge connecting the top end of said handle to said bow so that the telescoped handle can be folded over to lay on the front side of said shell, a spring controlled lever on the back of said shell, and a pin on the hinge of said handle designed to engage with said spring controlled lever and to securely hold said shell in the position of use.

In testimony whereof I affix my signature.

KARL ALB. SCHUCKER.